(12) United States Patent
Cook et al.

(10) Patent No.: US 8,650,166 B1
(45) Date of Patent: Feb. 11, 2014

(54) SYSTEMS AND METHODS FOR CLASSIFYING FILES

(75) Inventors: Randall R. Cook, Mapleton, UT (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/179,809

(22) Filed: Jul. 11, 2011

(51) Int. Cl.
G06F 7/00 (2006.01)
G06F 17/00 (2006.01)

(52) U.S. Cl.
USPC .......................................................... 707/694

(58) Field of Classification Search
USPC ......... 707/694, 617, 640, 651, 667, 672, 695, 707/713, 737, 741, 766, 770
See application file for complete search history.

(56) References Cited

U.S. PATENT DOCUMENTS

| | | | |
|---|---|---|---|
| 2004/0083408 A1* | 4/2004 | Spiegel et al. | 714/43 |
| 2006/0149748 A1* | 7/2006 | Yamakawa et al. | 707/10 |
| 2007/0103984 A1* | 5/2007 | Kavuri et al. | 365/185.17 |
| 2007/0179995 A1* | 8/2007 | Prahlad et al. | 707/202 |
| 2008/0028164 A1* | 1/2008 | Ikemoto et al. | 711/154 |
| 2009/0222509 A1* | 9/2009 | King et al. | 709/203 |
| 2009/0319772 A1* | 12/2009 | Singh et al. | 713/153 |
| 2010/0042625 A1* | 2/2010 | Zoellner et al. | 707/7 |
| 2010/0077168 A1* | 3/2010 | Arakawa | 711/165 |
| 2010/0250501 A1* | 9/2010 | Mandagere et al. | 707/692 |
| 2012/0047189 A1* | 2/2012 | Staffer et al. | 707/830 |
| 2012/0291087 A1* | 11/2012 | Agrawal | 726/1 |

OTHER PUBLICATIONS

Microsoft; Windows Server 2008 R2—File Classification Infrastructure; Published May 2009.

* cited by examiner

*Primary Examiner* — Robert Beausoliel, Jr.
*Assistant Examiner* — Nicholas Allen
(74) *Attorney, Agent, or Firm* — ALG Intellectual Property, LLC (57) ABSTRACT

A computer-implemented method for classifying files may include identifying data to be written to a file on a storage system. The method may also include, before the data is written to the storage system, 1) identifying a characteristic of the data, 2) determining, based on the characteristic of the data, a classification for the file, and 3) using the classification of the file to select a location within the storage system where the file should be stored. The method may further include writing the data to the file at the selected location within the storage system. Various other methods, systems, and computer-readable media are also disclosed herein.

20 Claims, 7 Drawing Sheets

SYSTEMS AND METHODS FOR CLASSIFYING FILES

BACKGROUND

In the electronic information age, people may share, access, and disseminate high volumes of information. The ease of disseminating information electronically is empowering. At the same time, the workforce has become increasingly mobile, and the ubiquity of high-speed Internet access, smart mobile devices, and portable storage means that "the office" may be anywhere. As a consequence, it has become more difficult than ever for organizations to organize and control data storage. Enterprises may implement a variety of different types of data management systems (e.g., data-loss-prevention systems, security systems, virtualization systems, etc.) to control, protect, and manage data.

Traditional data management systems may employ a variety of technologies to evaluate, organize, and/or protect data. Unfortunately, traditional data management systems may only evaluate, organize, and/or protect data after the data has been written to a storage system. This approach of traditional data management systems may have a variety of disadvantages. For example, sensitive data may been compromised if the data is written to an unsecure location before it is identified and moved to a secure location. Furthermore, valuable system resources (e.g., network bandwidth, memory, etc.) may not be used efficiently if data is written to a storage system and later moved by a data management system. What is needed, therefore, is a more effective mechanism for managing data.

SUMMARY

As will be described in greater detail below, the instant disclosure generally relates to systems and methods for classifying files. Embodiments of the instant disclosure may classify a file before the file (or a modification to the file) is written to a storage device to ensure that the file is stored in the proper location (e.g., in accordance with a data-loss-prevention policy and/or a data virtualization policy). For example, a method for classifying files may include identifying data to be written to a file on a storage system and, before the data is written to the storage system: 1) identifying a characteristic of the data, 2) determining, based on the characteristic of the data, a classification for the file (e.g., associating a tag with the file), and 3) using the classification of the file to select a location within the storage system where the file should be stored. The method may also include writing the data to the file at the selected location within the storage system.

The data may be identified in a variety of contexts. In at least one embodiment, identifying the data may include intercepting, at a data classification system, the data as it is being transferred to the storage system and before it is written to the storage system. In such embodiments, the classification for the file may be determined by the data classification system. Alternatively, the classification for the file may be determined by a software application that created the data.

A characteristic of the data may be identified in a variety of ways. In certain embodiments, identifying a characteristic of the data may include analyzing content of the data. Additionally or alternatively, identifying a characteristic of the data may include identifying and/or analyzing metadata of the data.

According to various embodiments, using the classification of the file to select a location within the storage system where the file should be stored may include using the classification of the file to select a virtualization layer where the file should be stored. In such embodiments, the virtualization layer may overlay a file system location of an underlying operating system such that access requests to the file system location of the underlying operating system are redirected the virtualization layer when the virtualization layer is active.

In some embodiments, using the classification of the file to select a location within the storage system where the file should be stored may include identifying a data-loss-prevention policy that indicates where files with the classification of the file are to be stored and using the data-loss-prevention policy to select the location within the storage system where the file should be stored.

The data may include a modification to an existing file or may be part of a new file. In embodiments where the data includes a modification to an existing file, the file may be moved to the selected location before the data is written to the file. In embodiments where the data includes a new file, writing the data to the file at the selected location may include creating the file at the selected location.

In one embodiment, a system for implementing the above-described method may include: 1) an identification module programmed to identify data to be written to a file on a storage system and identify a characteristic of the data before the data is written to the storage system; 2) a classification module programmed to determine, based on the characteristic of the data, a classification for the file before the data is written to the storage system; 3) a selection module programmed to use the classification of the file to select a location within the storage system where the file should be stored before the data is written to the storage system; 4) a storage module programmed to write the data to the file at the selected location within the storage system; and 5) at least one processor programmed to execute the identification module, the classification module, the selection module, and the storage module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to identify data to be written to a file on a storage system. The computer-executable instructions may also be programmed to cause the computing device to, before the data is written to the storage system, 1) identify a characteristic of the data, 2) determine, based on the characteristic of the data, a classification for the file, and 3) use the classification of the file to select a location within the storage system where the file should be stored. The computer-executable instruction may further be programmed to cause the computing device to write the data to the file at the selected location within the storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure generally relates to systems and methods for classifying files. Embodiments of the instant disclosure may classify a file before the file (or a modification to the file) is written to a storage device. In this manner, the systems and methods described herein may ensure that data is stored in the proper location, may efficiently use system resources, and may avoid situations where the security of a data is temporarily compromised. For example, before a modification is written to a file, the file may be classified and moved to a new location based on the classification (instead of being classified and moved after the modification is written to the file). The instant disclosure also provides various other features and advantages, as described in greater detail below.

Figure 1:
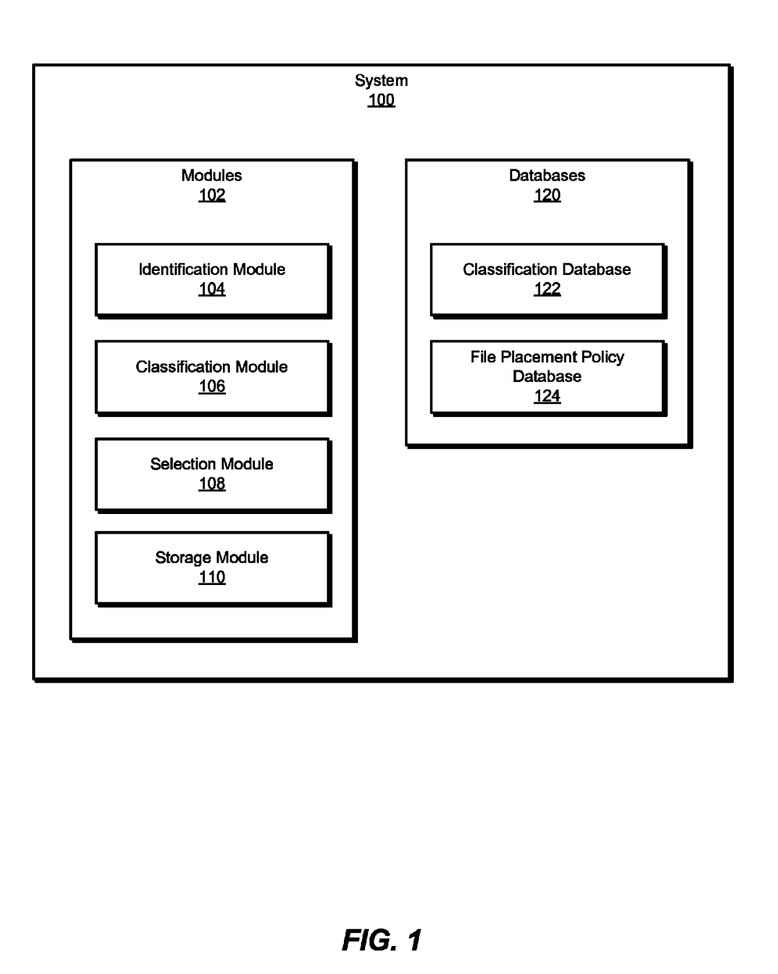
FIG. 1 is a block diagram of an exemplary system for classifying files.
Figure 2:
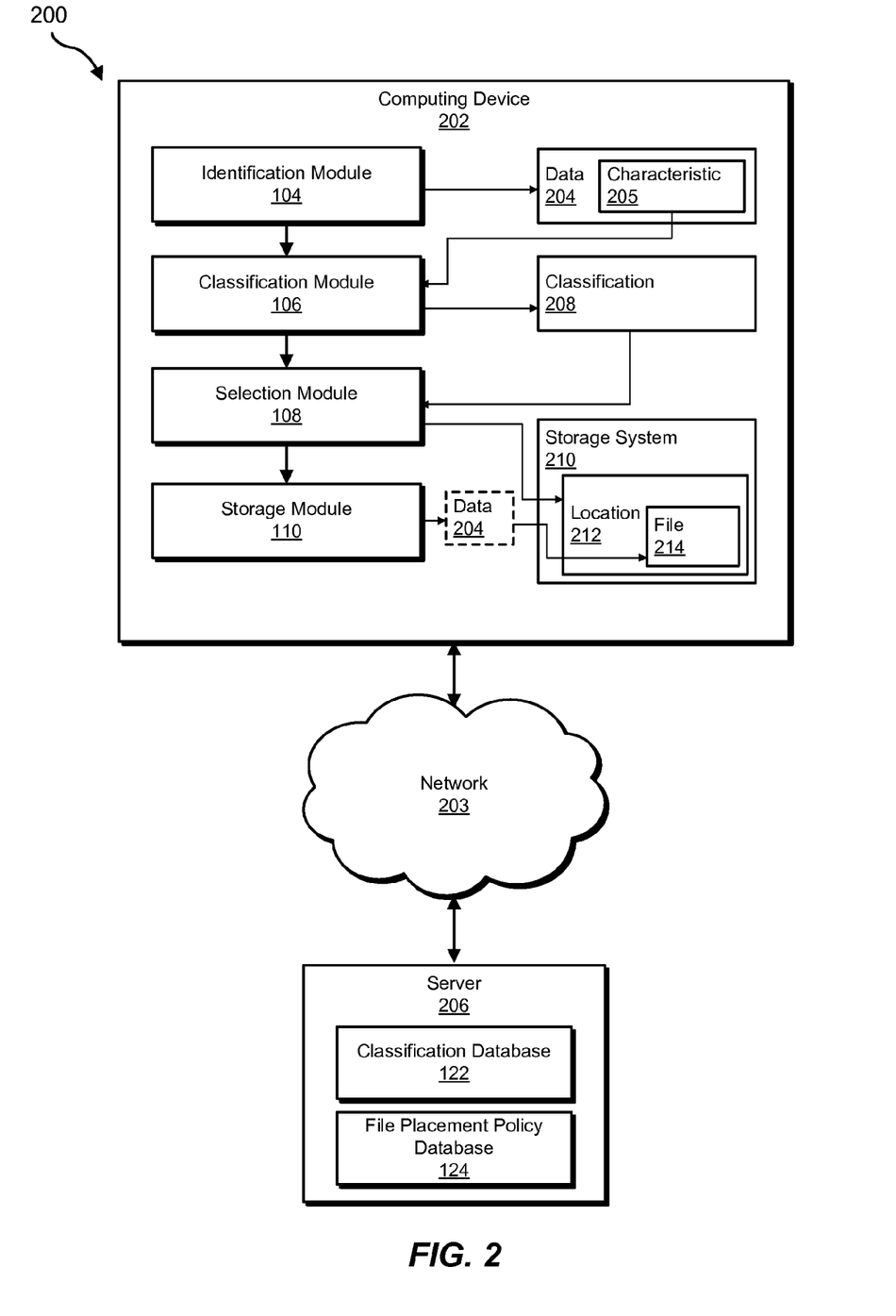
FIG. 2 is a block diagram of another exemplary system for classifying files.

The following will provide, with reference to FIGS. 1-2, detailed descriptions of exemplary systems for classifying files. Detailed descriptions of corresponding computer-implemented methods will also be provided in connection with FIG. 3. Descriptions of exemplary virtualization systems are described in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for classifying files. As illustrated in this figure, exemplary system 100 may include one or more modules 102 for performing one or more tasks. For example, and as will be explained in greater detail below, exemplary system 100 may include an identification module 104 programmed to identify data to be written to a file on a storage system and to identify a characteristic of the data before the data is written to the storage system. Exemplary system 100 may also include a classification module 106 programmed to determine, based on the characteristic of the data, a classification for the file before the data is written to the storage system.

In addition, and as will be described in greater detail below, exemplary system 100 may include a selection module 108 programmed to use the classification of the file to select a location within the storage system where the file should be stored before the data is written to the storage system. System 100 may also include a storage module 110 programmed to write the data to the file at the selected location within the storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. As shown, system 100 may include a classification database 122 for storing one or more file classifications and/or one or more associations between files and file classifications. System 100 may also include a file placement policy database 124 for storing one or more file placement policies (e.g., data-loss-prevention policies, security policies, virtualization policies, etc). As used herein, the phrase "file-placement policy" generally refers to any policy or rule that indicates a preferred or mandated location for storing a file. For example, a file placement policy may indicate that a file that containing confidential information should be stored in a secure location.

Databases 120 may represent portions of a single database or computing device or a plurality of databases or computing devices. For example, databases 120 may represent a portion of server 206 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 over a network 203.

Computing device 202 may include identification module 104 for identifying data 204 and for identifying a characteristic 205 of data 204. Computing device 202 may also include classification module 106 for using characteristic 205 of data 204 to select, provide, and/or create a classification 208 for data 204. In some embodiments, classification module 106 may access classification database 122 on server 206 to select classification 208 for data 204. Classification module 106 may also store an association between classification 208 and data 204 in classification database 122 on server 206.

Computing device 202 may also include a selection module 106 for using classification 208 of data 204 to select a location 212 in a storage system 210 to which data 204 is to be written. Storage system 210 generally represents any type or form of non-volatile and/or non-transient storage devices (e.g., one or more disk drives, one or more solid state drives, one or more flash storage devices, and/or any other type of non-volatile storage device) local to and/or remote from computing device 202.

In some embodiments, selection module 106 may identify a file placement policy in file placement policy database 124 on server 206. Selection module 106 may then select location 212 in accordance with the file placement policy. While shown on server 206, classification database 122 and/or file placement policy database 124 may be located on computing device 202, may be located at different remote locations, or may not be a necessary part of system 200.

As also shown in FIG. 2, computing device 202 may further include storage module 110 for writing data 204 to file 214 at selected location 212.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Server 206 generally represents any type or form of computing device that is capable of enabling data management. Examples of server 206 include, without limitation, application servers and database servers configured to provide various database services and/or run certain software applications.

Network 203 generally represents any medium or architecture capable of facilitating communication or data transfer. Examples of network 203 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 203 may facilitate communication or data transfer using wireless or wired connections. In one embodiment, network 203 may facilitate communication between computing device 202 and server 206.

Figure 3:
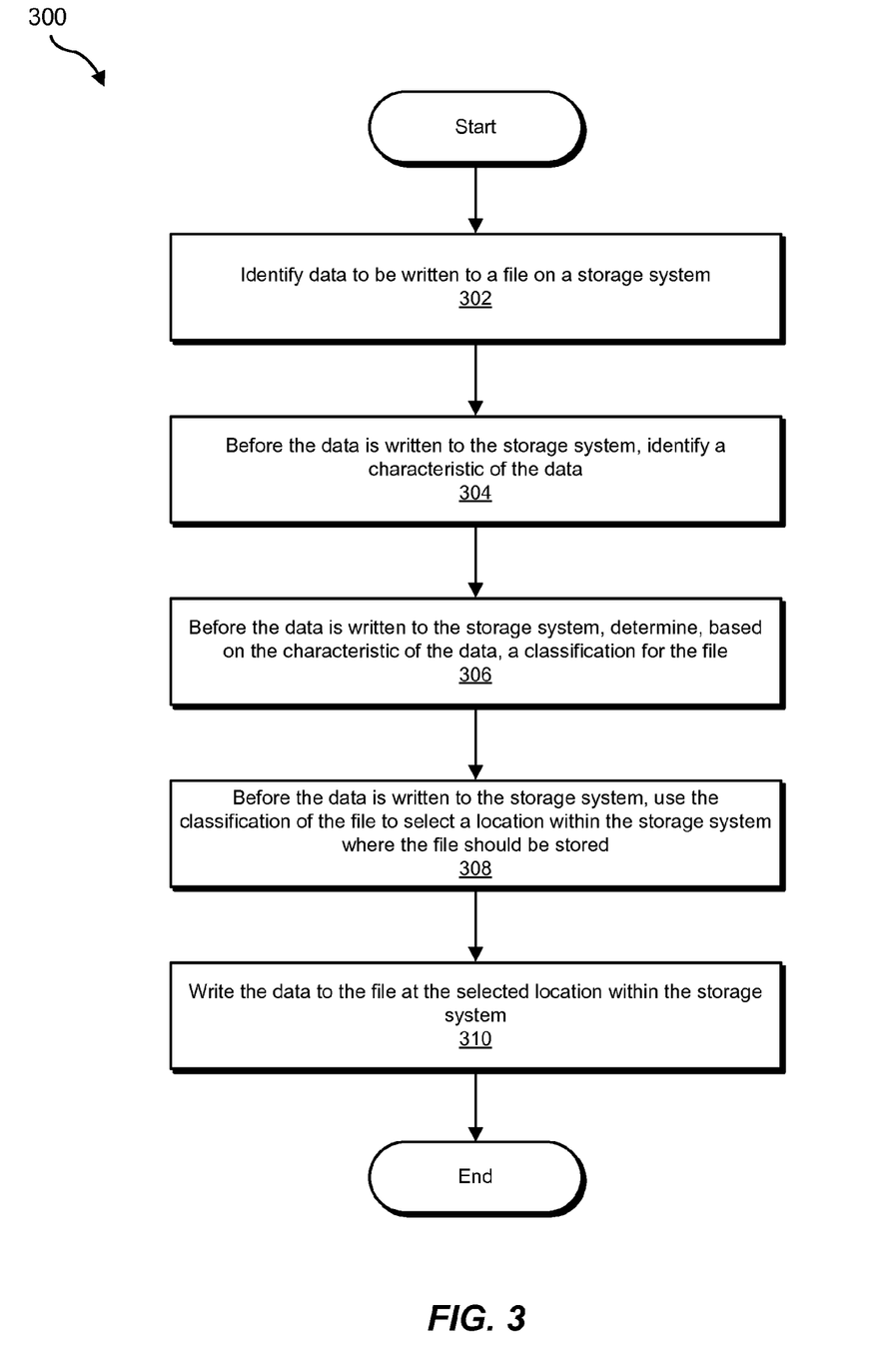
FIG. 3 is a flow diagram of an exemplary method for classifying files.

FIG. 3 is a flow diagram of an exemplary computer-implemented method 300 for classifying files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302 in FIG. 3 one or more of the systems described herein may identify data to be written to a file on a storage system. For example, identification module 104 in FIG. 1 (which may, as detailed above, represent a portion of computing device 202 in FIG. 2) may identify data 204 to be written to file 214 on storage system 210.

As used herein, the term "data" generally refers to any type or form of information in a format suitable for use by a computing system. As used herein, the term "file" generally refers to any type or form of entity or container for storing one or more items of data. The term "file" may refer to a data file, an executable file, one or more file segments or other portions of files, database entries, and/or one or more segments of executable code.

Identification module 104 may identify data 204 in a variety of different contexts and/or manners. For example, identification module 104 may identify data 204 as it is being transferred to storage system 210 but before it is written to storage system 210. In such embodiments, a data classification system may intercept data 204 using a file system filter driver and/or any other suitable mechanism for intercepting data input/output operations to a storage system.

Additionally or alternatively, identification module 104 may be part of an application program responsible for creating, modifying, and/or moving data 204. In such embodiments, identification module 104 may identify data 204 as data 204 is created, modified, and/or moved. For example, if a user adds data 204 to a spreadsheet file, identification module 104, which may be part of the spreadsheet software application, may identify data 204 before it is written to storage system 210.

Identification module 104 may identify data that is to be written to an existing file and/or may identify data that constitutes a new file to be written to a storage system. In other words, in some embodiments data 204 may represent one or more modifications to an existing file, while in other embodiments data 204 may represent a new file.

At step 304 in FIG. 3, one or more of the systems described herein may, before the data is written to the storage system, identify a characteristic of the data. For example, identification module 104 in FIG. 1 may identify characteristic 205 of data 204 before data 204 is written to storage system 210.

Identification module 104 may identify characteristic 205 of data 204 in a variety of different ways. For example, identification module 104 may identify characteristics 205 of data 204 by scanning the content of data 204. In such embodiments, identification module 104 may scan the content of data 204 for information protected by intellectual property, financial information, sales information, personal information of users, information about clients, and/or any other type of information.

Additionally or alternatively, identification module 104 may identify characteristic 205 of data 204 by identifying a location to which data 204 is directed to be stored, by identifying an owner of data 204, by identifying a program that created data 204, by identifying a time at which data 204 was created and/or modified, and/or by identifying any other attribute of data 204 (e.g., by identifying metadata of data 204).

In some embodiments, characteristic 205 of data 204 may be identified by a classification system that intercepts data 204. Additionally or alternatively, characteristic 205 of data 204 may be identified by the application program responsible for generating data 204.

At step 306 in FIG. 3, one or more of the systems described herein may determine, based on the characteristic of the data, a classification for the file to which the data is to be written. The file may be classified before the data is written to the storage system. For example, before data 204 is written to file 214 on storage system 210, classification module 106 (which, as detailed above, may be part of computing device 202 in FIG. 2) may determine, based on characteristic 205 of data 204, a classification 208 for file 214.

Classification module 106 may determine one or more classifications for file 214 in any suitable manner. For example, classification module 106 may classify file 214 by analyzing characteristic 205 of data 204 and selecting a categorization (e.g., a tag) for file 214 that corresponds to characteristic 205. In some embodiments, classification module 106 may select a classification from a set of classifications stored in classification database 122. Alternatively, classification module 106 may generate a new classification indicative of characteristic 205.

Classification module 106 may use characteristic 205 in determining any suitable classification (or classifications) for file 214. As an example, if characteristic 205 indicates that data 204 contains corporate financial information, classification module 106 may classify file 214 as confidential. As another example, if characteristic 205 indicates that data 204 contains information generated within the past week, classification module 206 may classify file 214 as containing new information. As a third example, if characteristic 205 indicates that data 204 contains executable code capable of transmitting data to an external location, classification module 206 may classify file 214 as an potentially risky. Other classifications may include a classification for privileged information, a classification for sensitive information, a classification for intellectual property, a classification for user-generated information, and/or any other type of classification.

As part of determining classification 208 for file 214, classification module 106 may associate classification 208 with file 214. Classification module 106 may associate classification 208 with file 214 in a variety of ways. For example, classification module 106 may tag file 214 with classification 208 (e.g., by storing classification 208 as metadata of file 214). In other embodiments, classification module 106 may create an association between file 214 and classification 208 in classification database 122.

In some embodiments, classification module 106 may be part of a classification system that determines classification 208 for file 214. Additionally or alternatively, file 214 may be classified by the application program responsible for writing data 204 to file 214. In such embodiments, an application developer may specify one or more classifications to be assigned to a file created by an application developed by the developer. In this manner, application programs (e.g., word processing programs, spreadsheet programs, database programs, and/or any other type of software program) may classify the data they generate before the data is written to a storage device.

As discussed above, file 214 may be classified before data 204 is written to file 214. File 214 may be classified while data 204 exists in volatile memory (e.g., random-access-memory allocated to a program responsible for creating, modifying, and/or moving data 204). In situations where the data is a modification to a file, the file may be classified with respect to the content of the data to be written to the file before the data is actually written to the file. In other words, a file may be pre-classified based on data that is about to be written to the file. In situations where the data is part of a new file, the file may be classified before it is actually created in a storage system (e.g., created in a file system of storage system 210), enabling the new file to be created in the correct location (e.g., in a location dictated by a file placement policy).

At step 308 in FIG. 3, or more of the systems described herein may, before the data is written to a storage system, use the classification of the file to select the location within the storage system where the file should be stored. For example, selection module 108 in FIG. 1 (which may, as detailed above, be part of computing device 202 in FIG. 2) may use classification 208 of file 214 to select location 212 within storage system 210.

As used herein, the phrase "location within the storage system where the file should be stored" generally refers to any location where a file is required to be stored and/or any preferred location for storing a file. In some embodiments, a location where a file should be stored may be defined in negative terms (i.e., by identifying locations where the file system should not be stored). A location within a storage system where a file should be stored may be identified by a file placement policy, by performing an analysis of a storage system, and/or in any other suitable manner. A location within a storage system where a file should be stored may be a location identified by an application that created the file and/or may be different than the location identified by the application that created the file.

Selection module 108 may use classification 208 of file 214 to select a location for file 214 in a variety of ways. For example, selection module 108 may apply a file placement policy to classification 208 to determine where file 214 should be stored. Selection module 108 may also implement any other suitable algorithm or heuristic to use classification 208 to select a location where file 214 should be stored.

Selection module 108 may be part of one or more of a variety of file-placement systems. For example, selection module 108 may be part of a data-loss-prevention system that protects an enterprise's data from being compromised, a security system that protects a computing system and/or a computing network from malware, and/or a virtualization system that stores data in virtualization layers.

In embodiments where selection module 108 is part of a data-loss-prevention system, selection module 108 may apply a data-loss-prevention policy to classification 208 to determine where file 214 should be stored. As used herein, the phrase "data-loss-prevention policy" generally refers to any policy and/or rule that describes, defines, or otherwise identifies particular file classifications that an organization desires to protect. A data-loss-prevention policy may also indicate where such files should be stored. For example, a data-loss-prevention policy may indicate that files classified as confidential, privileged, and/or sensitive should be stored in a secure location.

In embodiments where selection module 108 is part of a security system, selection module 108 may apply a security policy to classification 208 to determine where file 214 should be stored. For example, a security policy may indicate that files classified as being potentially risk should be stored in a quarantined location until the files can be further evaluated and/or remediated.

In embodiments where selection module 108 is part of a virtualization system, a file placement policy may include a data virtualization policy. As used herein, the phrase "data virtualization policy" generally refers to any policy and/or rule that identifies a virtualization layer to which a file with a particular classification should be stored. As an example, a data virtualization policy may indicate that a file classified as including personal information of a particular user should be stored in a virtualization layer that is only accessible by the particular user.

Data virtualization policies may use data categorization in combination with other types of other information (e.g., inclusion and/or exclusion entries that indicate locations to which certain types of data should be written, information about a process that is writing the data, etc.) to select storage locations to which the data should be written.

Data virtualization policies may also be used in conjunction with data-loss-prevention policies and/or data security policies. For example, a data virtualization policy may indicate that confidential data should be stored in a secure virtualization layer. As another example, a data virtualization policy may indicate that potentially risky data (e.g., data that might contain malware) should be sandboxed in a virtualization layer that is isolated from the rest of a system.

Figure 4:
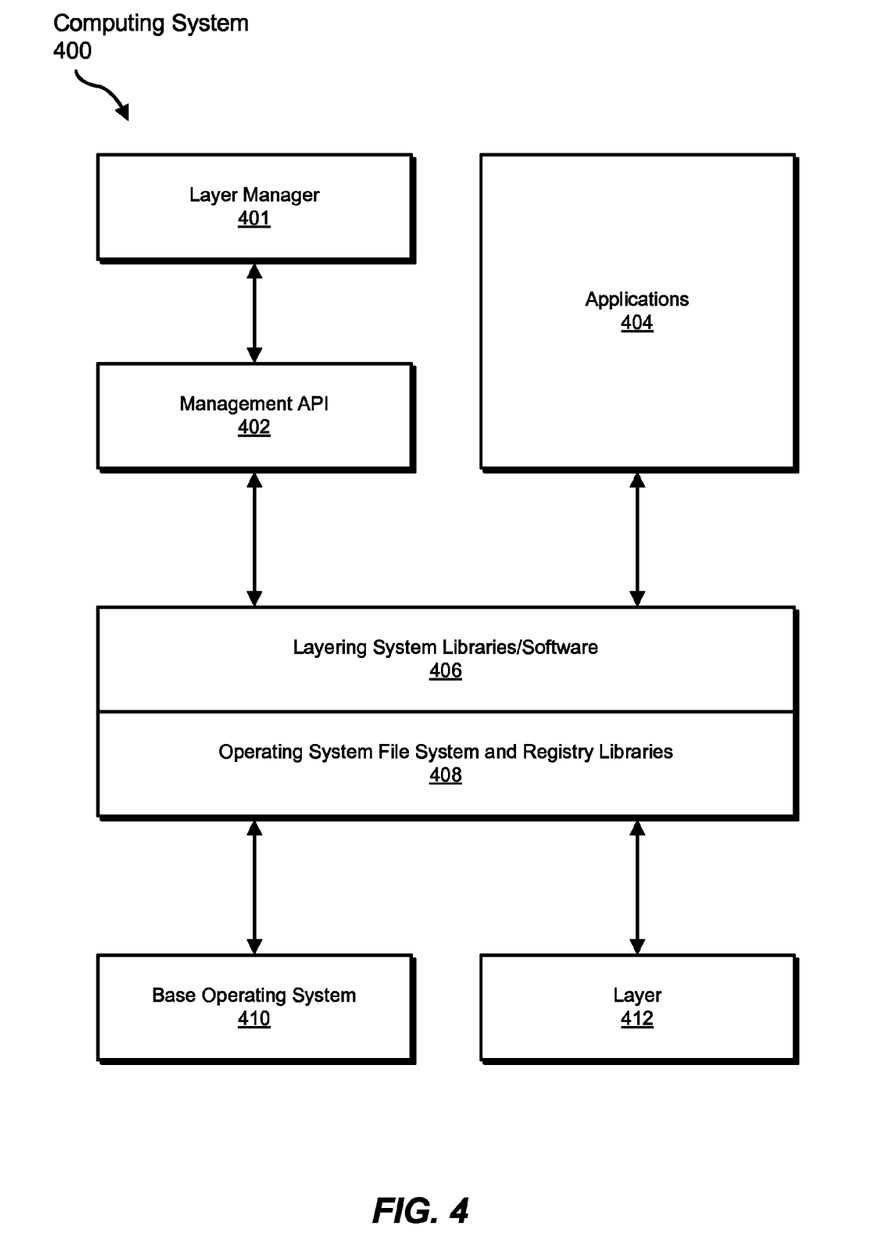
FIG. 4 is a block diagram of an exemplary virtualization system.
Figure 5:
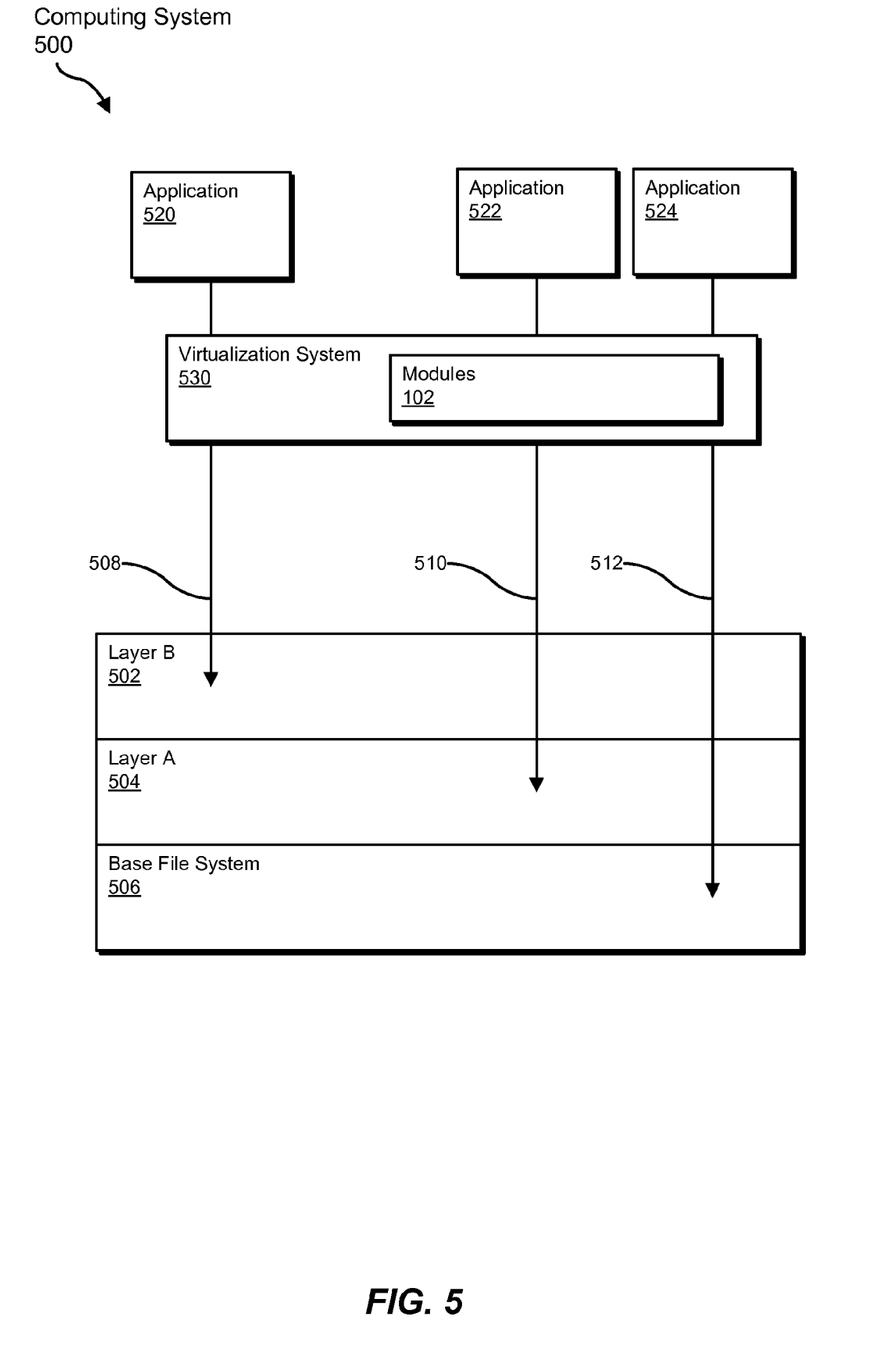
FIG. 5 is a block diagram of an exemplary system for assigning files to virtualization layers based on classification.

As described in greater detail in the discussion of FIGS. 4 and 5, the phrase "virtualization layer" generally refers to a virtual container that may overlay a file system location of an underlying operating system (i.e., base operating system) such that access requests to the file system location of the underlying operating system are redirected to the virtualization layer when the virtualization layer is active.

Returning to FIG. 3, at step 310 one or more of the systems described herein may write the data to the file at the selected location within storage system. For example, storage module 110 in FIG. 1 (which may, as detailed above, be part of computing device 202) may write data 204 to file 214 at selected location 212 within storage system 210.

In embodiments where file 214 is an existing file and data 204 is a modification to file 214, storage module 110 may write the data to file 214 at location 212 by moving file 214 to location 212 before writing data 204 to file 214. After file 214 is moved to location 212, storage module 110 may write data 204 to selected location 212.

In embodiments where data 204 is part of a new file that has not yet been written to storage system 210, storage module 110 may write data 204 to file 214 at selected location 212 by first creating file 214 at location 212 and then writing data 204 to file 214 at location 212. For example, an application program may attempt to create a file in an unsecure location in storage system 210. Selection module 108 may determine that the file should be stored at a secure location rather than the unsecure location, and storage module 110 may cause the file to be created at the secure location rather than the unsecure location.

FIGS. 4 and 5 illustrate examples of application virtualization and how files may be written to virtualization layers in accordance with data virtualization policies. FIG. 4 shows a conceptual organization of components of a computing system 400 with a virtualization layer to which a file may be written after being categorized. A base operating system 410 may form a platform with which applications may be executed and from which files may be accessed in file systems. Base operating system 410 may include registry settings, which may be globally available to applications for reading and writing. Computing system 400 may include libraries 408 for executing the functions of the operating system. Libraries 408 may include operating system files and registry entries. Layering system software 406 may be tied to libraries 408. Layering system software 406 may interpret file system and registry accesses from applications 404. Layering system software 406 may apply a virtualization policy to a categorization of a file to determine whether the file should be written to base operating system 410 or should be written to virtualization layer 412.

If a virtualization policy indicates that data is to be written to a virtualization layer, layer manager 401 may create a layer (e.g., layer 412) and layering system software 406 may redirect writing of the data to layer 412. Layer manager 401 may control configuration of layering system software 406 through a management Application Programming Interface (API) 402.

In an ordinary file system, an operating system may apply a file pathname to a file system to reach a file, which might exist, for example, as a series of data blocks on a hard disk. Some operating systems permit access to a plurality of file systems, each existing in a confined name space. For example, in a Microsoft Windows environment a file name is preceded by a drive letter, for example "C:". A Linux operating system also utilizes prefixed directories; some Linux distributions provide for file systems to be mounted under the "/mnt" namespace. In any case, such an operating system can determine the single location of access for a file by an evaluation of a file pathname by extracting and examining the relevant portion thereof.

In contrast, a system that supports file system layering (e.g., such as the system shown in FIG. 4) may provide for more than one location of access for a particular file pathname. Such a layered operating system can therefore look in two or more repositories of file objects, which are referred to herein as virtualization layers, such as layer 412. As there may be more than one potential location for a file at a particular pathname, a virtualization system may perform an extra computing step in order to determine the "owner" layer of an accessed file, which may be the layer applied to the file access. For file read accesses, this may involve a search of the layers in an order of priority to find the layer with highest priority that also contains a file corresponding to the requested pathname. For write accesses, this may involve a search of the layers, also in an order of priority (the priority may be determined by a categorization of the file to be written, among a variety of other factors), to determine the highest ranked layer to which the file may be written.

The contents of a virtualization layer may be presented or made inaccessible to operating system 408 by enabling or disabling the layer, respectively (which may also be referred to as activating and deactivating a layer). Thus the contents of a layer are organized in a single container that can be presented, withdrawn, moved, and/or deleted as a unit. A layer that is enabled for access to the operating system may overlay its contents to the base file system, and thus the layer contents may appear to the operating system as though they are in their ordinary and expected locations in the base file system. If a layer is disabled or removed, the layer contents no longer appear to the processes of the operating system, and thus a layer may provide a convenient way to deposit or remove files from a computer as a higher-order unit.

FIG. 5 shows the operation of a computing system 500 with multiple virtualization layers 502 and 504 and a base file system 506. Computing system 500 may also include applications 520, 522, and 524 and a virtualization system 530 that includes one or more modules 102. Virtualization system 530 may redirect data writes to virtualization layer B 502 and/or virtualization layer A 504 based on file classifications. Thus, one or more files associated with applications 520, 522, and 524 may be stored on virtualization layer B 502, virtualization layer A 504, and/or base file system 506.

Virtualization layer B may provide a high level of security, virtualization layer A may be protected for use by a particular user, and base file system 506 may provide no security. Application 520 may perform a first write operation 508, and virtualization system 530 may determine that the write operation is attempting to create a classified document on the base file system. Virtualization system 530 may determine that classified documents should be written to layer B 502 and may therefore redirect write operation 508 to virtualization layer B.

Application 522 may perform a second write operation 510 to create a file that contains personal information of a user with access rights to layer A 504. Virtualization system 530 may identify the personal information and determine that the attempt to create the file with the personal information should be redirected to layer A 504.

Application 524 may perform a third write operation 512 to create a file containing public marketing data. Virtualization system 530 may identify the marketing data and determine that the file containing the marketing data does not need to be written to a virtualization layer. Thus, virtualization system 530 may allow the file to be written to base file system 506.

Figure 6:
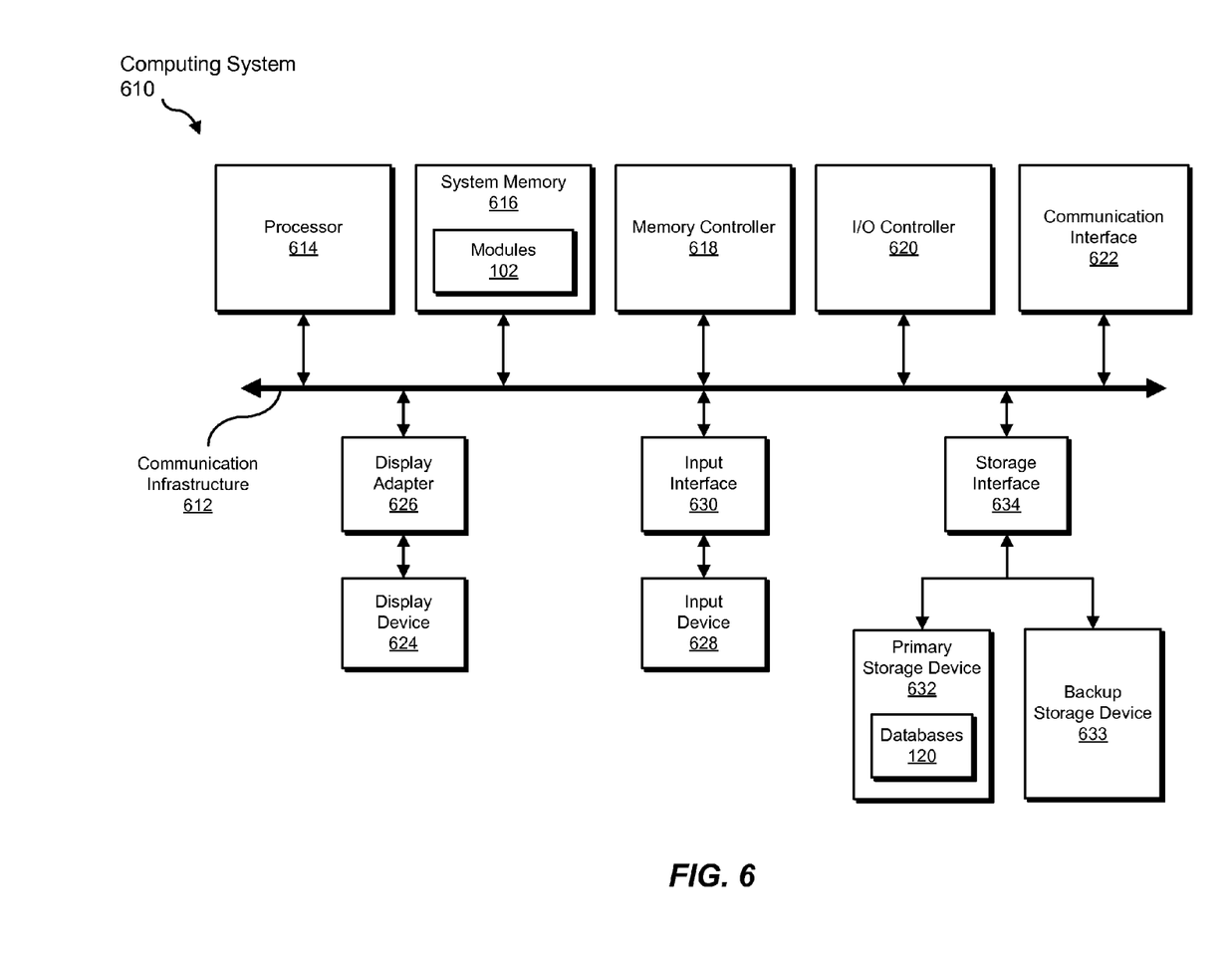
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 410 may perform and/or be a means for performing, either alone or in combination with other elements, one or more of the identifying, determining, using, writing, intercepting, moving, selecting, and associating steps described herein. All or a portion of computing system 410 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
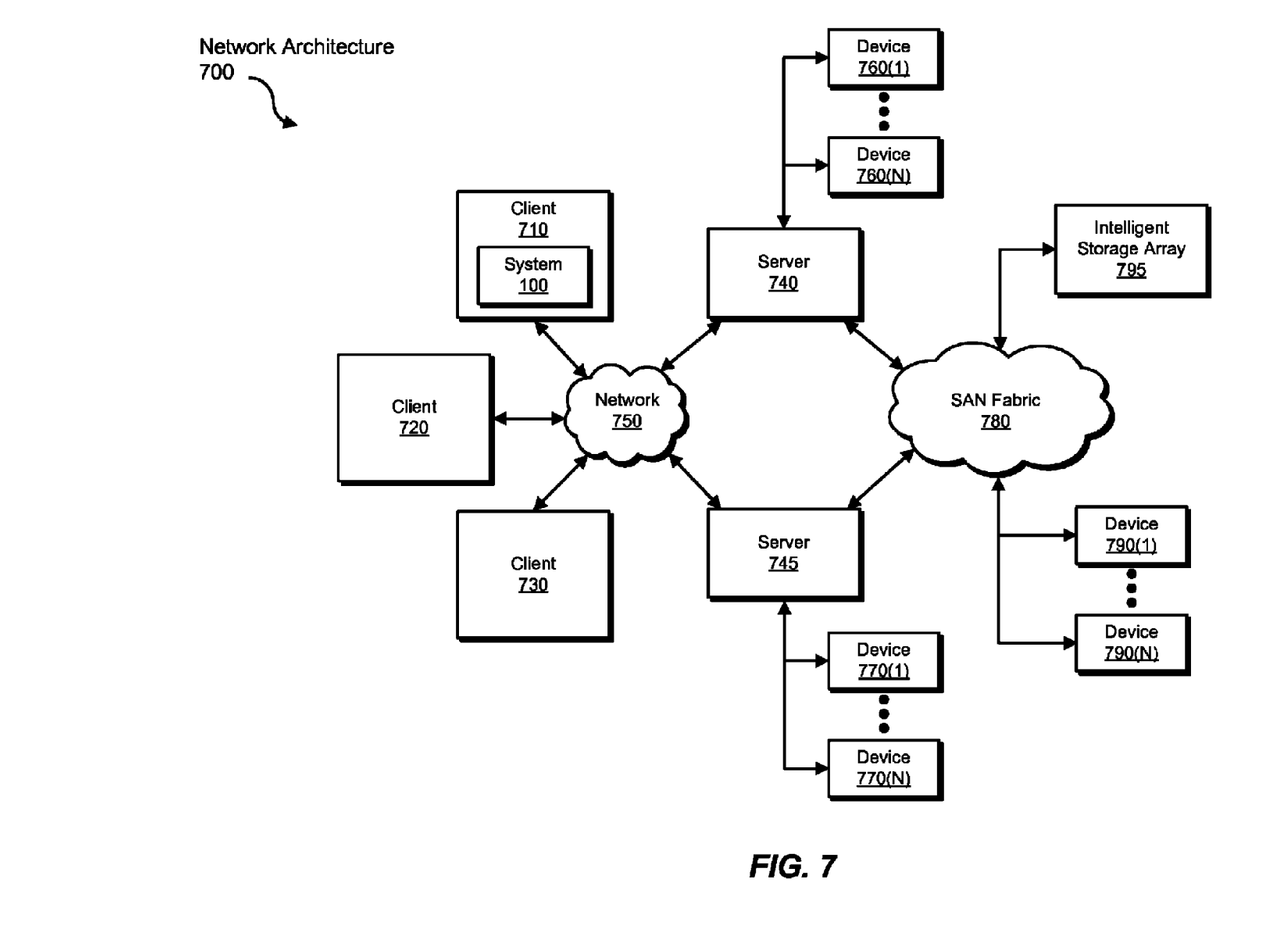
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, determining, using, writing, intercepting, moving, selecting, and associating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for classifying files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a storage device by selecting locations for data writes based on classifications of the data being written.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for classifying files, at least a portion of the method being performed by a computing device comprising at least one processor, the method comprising:
   identifying data to be written to a file on a storage system, the file comprising a classified document;
   before the data is written to the storage system:
      identifying a characteristic of the data;
      identifying a file-placement policy;
      determining, based on the characteristic of the data, a classification for the file at least in part by:
         selecting a tag that corresponds to the characteristic of the data;
         associating the tag with the file;
         using the tag to select a location within the storage system where the file should be redirected from a different location to which the data was originally directed by applying the file-placement policy to the tag at least in part by using the tag to select a secure virtualization layer where the classified document should be redirected from an insecure base file system to which the data was originally directed;
   redirecting the data to the file at the selected location within the storage system.

2. The method of claim 1, wherein identifying the data comprises:
   intercepting, at a data classification system, the data as it is being transferred to the storage system and before it is written to the storage system, wherein the classification for the file is determined by the data classification system.

3. The method of claim 1, wherein identifying the characteristic of the data comprises scanning contents of the data.

4. The method of claim 1,
   wherein the secure virtualization layer overlays a base file system location of an underlying operating system such that access requests to the base file system location of the underlying operating system are redirected to the secure virtualization layer when the secure virtualization layer is active.

5. The method of claim 1, wherein identifying the characteristic of the data comprises identifying metadata of the data.

6. The method of claim 1, further comprising:
   moving the file to the selected location before writing the data to the file.

7. The method of claim 1, wherein:
   redirecting the data to the file at the selected location comprises creating the file at the selected location.

8. The method of claim 1, wherein:
   identifying the file-placement policy comprises identifying a data-loss-prevention policy that indicates where files with the classification of the file are to be redirected;
   using the tag to select the location within the storage system where the file should be redirected comprises using the data-loss-prevention policy to select the location within the storage system where the file should be redirected.

9. The method of claim 1, wherein determining the classification for the file comprises:
   analyzing the characteristic of the data;
   selecting a categorization that corresponds to the characteristic.

10. A system for classifying files, the system comprising:
an identification module programmed to:
  identify data to be written to a file on a storage system, the file containing personal information of a user with access rights to a virtualization layer;
  identify a characteristic of the data before the data is written to the storage system;
  identify a file-placement policy;
a classification module programmed to determine, based on the characteristic of the data, a classification for the file before the data is written to the storage system at least in part by:
  selecting a tag that corresponds to the characteristic of the data;
  associating the tag with the file;
a selection module programmed to use the tag to select a location within the storage system where the file should be redirected from a different location to which the data was originally directed before the data is written to the storage system by applying the file-placement policy to the tag at least in part by using the tag to select the virtualization layer to which the user has access rights where the file should be redirected from an insecure base file system to which the data was originally directed;
a storage module programmed to redirect the data to the file at the selected location within the storage system;
at least one processor programmed to execute the identification module, the classification module, the selection module, and the storage module.

11. The system of claim 10, wherein:
the identification module comprises a data classification system;
the identification module intercepts the data as it is being transferred to the storage system and before it is written to the storage system;
the classification for the file is determined by the data classification system.

12. The system of claim 10, wherein:
the classification for the file is determined by a software application that created the data.

13. The system of claim 10,
wherein the virtualization layer overlays a base file system location of an underlying operating system such that access requests to the base file system location of the underlying operating system are redirected to the virtualization layer when the virtualization layer is active.

14. The system of claim 10, wherein:
the identification module is programmed to identify the characteristic of the data by analyzing content of the data.

15. The system of claim 10, wherein:
the storage module is programmed to move the file to the selected location before writing the data to the file.

16. The system of claim 10, wherein:
the storage module is programmed to redirect the data to the file at the selected location by creating the file at the selected location.

17. The system of claim 10, wherein:
the identification module is programmed to identify the file-placement policy by identifying a data-loss-prevention policy that indicates where files with the classification of the file are to be redirected;
the selection module is programmed to use the tag to select the location within the storage system where the file should be redirected by using the data-loss-prevention policy to select the location within the storage system where the file should be redirected.

18. The system of claim 17, wherein the data-loss-prevention policy indicates that files classified as being potentially risky should be stored in a quarantined location until the potentially risky files can be further evaluated and/or remediated.

19. A computer-readable-storage medium comprising one or more computer-executable instructions that, when executed by at least one processor of a computing device, cause the computing device to:
identify data to be written to a file on a storage system, the file comprising a classified document;
before the data is written to the storage system:
  identify a characteristic of the data;
  identify a file-placement policy;
  determine, based on the characteristic of the data, a classification for the file at least in part by:
    selecting a tag that corresponds to the characteristic of the data;
    associating the tag with the file;
  use the tag to select a location within the storage system where the file should be redirected from a different location to which the data was originally directed by applying the file-placement policy to the tag at least in part by using the tag to select a secure virtualization layer where the classified document should be redirected from an insecure base file system to which the data was originally directed;
redirect the data to the file at the selected location within the storage system.

20. The computer-readable-storage medium of claim 19, wherein the secure virtualization layer overlays a base file system location of an underlying operating system such that access requests to the base file system location of the underlying operating system are redirected to the secure virtualization layer when the secure virtualization layer is active.

* * * * *